US011620192B2

(12) United States Patent
Nowatzyk et al.

(10) Patent No.: US 11,620,192 B2
(45) Date of Patent: Apr. 4, 2023

(54) HARDWARE-ASSISTED MEMORY DISAGGREGATION WITH RECOVERY FROM NETWORK FAILURES USING NON-VOLATILE MEMORY

(71) Applicant: VMware, Inc., Palo Alto, CA (US)

(72) Inventors: Andreas Nowatzyk, Palo Alto, CA (US); Pratap Subrahmanyam, Saratoga, CA (US); Isam Akkawi, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 203 days.

(21) Appl. No.: 16/926,520

(22) Filed: Jul. 10, 2020

(65) Prior Publication Data

US 2022/0012139 A1 Jan. 13, 2022

(51) Int. Cl.
  *G06F 12/0815* (2016.01)
  *G06F 15/173* (2006.01)
  *G06F 11/14* (2006.01)
  *G06F 11/07* (2006.01)
  (Continued)

(52) U.S. Cl.
  CPC ...... *G06F 11/1469* (2013.01); *G06F 9/30043* (2013.01); *G06F 9/467* (2013.01); *G06F 11/0757* (2013.01); *G06F 11/0772* (2013.01); *G06F 11/1451* (2013.01); *G06F 11/1464* (2013.01); *G06F 12/0815* (2013.01); *G06F 15/1735* (2013.01); *G06F 2212/2542* (2013.01)

(58) Field of Classification Search
  None
  See application file for complete search history.

(56) References Cited

U.S. PATENT DOCUMENTS 7,917,599 B1 * 3/2011 Gopalan ............. H04L 67/2842
  709/216
2010/0332908 A1 * 12/2010 Johnsen .............. H04L 12/6418
  714/39

(Continued)

OTHER PUBLICATIONS

Ongaro et al. "Fast Crash Recovery in RAMCloud." ACM. Oct. 2011. SOSP '11. pp. 29-41.*

(Continued)

*Primary Examiner* — Nathan Sadler (57) ABSTRACT

Techniques for implementing hardware-assisted memory disaggregation with recovery from network failures/problems are provided. In one set of embodiments, a hardware controller of a computer system can maintain a copy of a "remote memory" of the computer system (i.e., a section of the physical memory address space of the computer system that maps to a portion of the physical system memory of a remote computer system) in a local backup memory. The backup memory may be implemented using a non-volatile memory that is slower, but also less expensive, than conventional dynamic random-access memory (DRAM). Then, if the hardware controller is unable to retrieve data in the remote memory from the remote computer system within a specified time window due to, e.g., a network failure or other problem, the hardware controller can retrieve the data from the backup memory, thereby avoiding a hardware error condition (and potential application/system crash).

21 Claims, 4 Drawing Sheets

(51) Int. Cl.
   *G06F 9/30*   (2018.01)
   *G06F 9/46*   (2006.01)

(56) References Cited

U.S. PATENT DOCUMENTS

2013/0290462 A1*  10/2013  Lim .................... G06F 12/0866
                                                     709/213
2020/0050547 A1*   2/2020  Rustad ................ G06F 12/0813
2021/0311900 A1*  10/2021  Malladi ............... G06F 12/0808

OTHER PUBLICATIONS

Gu et al. "Efficient Memory Disaggregation with Infiniswap." Usenix. Mar. 2017. NSDI '17. pp. 649-667.*
Aguilera et al. "Remote memory in the age of fast networks." ACM. Sep. 2017. SoCC '17.*
Calcui et al. "Project PBerry: FPGA Acceleration for Remote Memory." ACM. May 2019. HotOS '19. pp. 127-135.*
Hennessy et al. Computer Architecture. 2007. Morgan Kaufmann. 4th ed. pp. C-38-C-46.*

\* cited by examiner

FIG. 4

HARDWARE-ASSISTED MEMORY DISAGGREGATION WITH RECOVERY FROM NETWORK FAILURES USING NON-VOLATILE MEMORY

BACKGROUND

Unless otherwise indicated, the subject matter described in this section is not prior art to the claims of the present application and is not admitted to be prior art by inclusion in this section.

With the development and deployment of high-speed networking technologies such as 100G (gigabit) Ethernet, 400G Ethernet, and beyond, the latency of transferring data between networked servers in modern data centers is approaching the bandwidth for accessing that data from local physical system memory (i.e., dynamic random-access memory (DRAM)). Accordingly, it is becoming increasingly practical to implement a type of cross-server memory sharing in such data centers that is referred to herein as hardware-assisted memory disaggregation. As explained in further detail below, hardware-assisted memory disaggregation enables a first server in a data center to "borrow," via a hardware (HW) controller residing at that first server, a portion of the physical system memory of one or more second (i.e., remote) servers in the data center for use by the first server's software processes (e.g., applications, containers, virtual machines (VMs), etc.). This mechanism advantageously reduces the total cost of ownership (TCO) of the data center by improving memory utilization across the data center and by avoiding the need to provision an amount of DRAM on each server that accounts for the worst case memory usage scenario (i.e., the most memory-demanding process).

One challenge with implementing hardware-assisted memory disaggregation is that, due to the nature of the cache-coherent interface through which the HW controller at the first server communicates with the first server's local central processing unit (CPU), at the time the CPU requests data which resides in remote memory (i.e., physical system memory belonging to and borrowed from a remote server), the HW controller must retrieve the data and return it to the CPU within a specified time window. If the CPU does not receive the requested data within this time window, a hardware error condition (e.g., machine check exception) is triggered that will typically result in an application or system-wide crash. Unfortunately, there are a multitude of relatively common network failures/problems such as network partition events, excess tail latency due to intermittent link congestion, and so on which can prevent the HW controller from retrieving the requested data from the remote server in a timely fashion. Thus, it is important that such network failures/problems are handled gracefully in order for hardware-assisted memory disaggregation to achieve a reasonable level of reliability.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Overview

Embodiments of the present disclosure are directed to techniques for gracefully handling network failures/problems in a server deployment that employs hardware-assisted memory disaggregation. At a high level, these techniques involve adding, to each server S in the deployment that is configured to borrow physical system memory from one or more other (i.e., remote) servers, a backup memory component which comprises relatively low-cost non-volatile memory (e.g., flash memory, Optane memory, X-Point memory, etc.). This backup memory maintains a complete copy of the data in the remote memory that is borrowed by server S from the remote server(s).

When a CPU of server S requests data that falls within the address range of the remote memory (and thus resides in the physical system memory of a remote server R), a HW controller of S that manages the memory disaggregation mechanism can attempt to retrieve the data over the network from R. If the HW controller receives the data from R within a time window T required by the CPU, the HW controller can provide the received data to the CPU. However, if the HW controller does not receive the data from R within T (or within a second time window that is somewhat shorter than T) due to a network failure or other problem, the HW controller can instead retrieve the data from the local backup memory. The HW controller can then return the data retrieved from the backup memory to the CPU within its required time window, thereby avoiding a machine check exception and application/system crash.

The foregoing and other aspects of the present disclosure are described in further detail in the sections that follow.

2. System Environment and Solution Architecture

Figure 1:
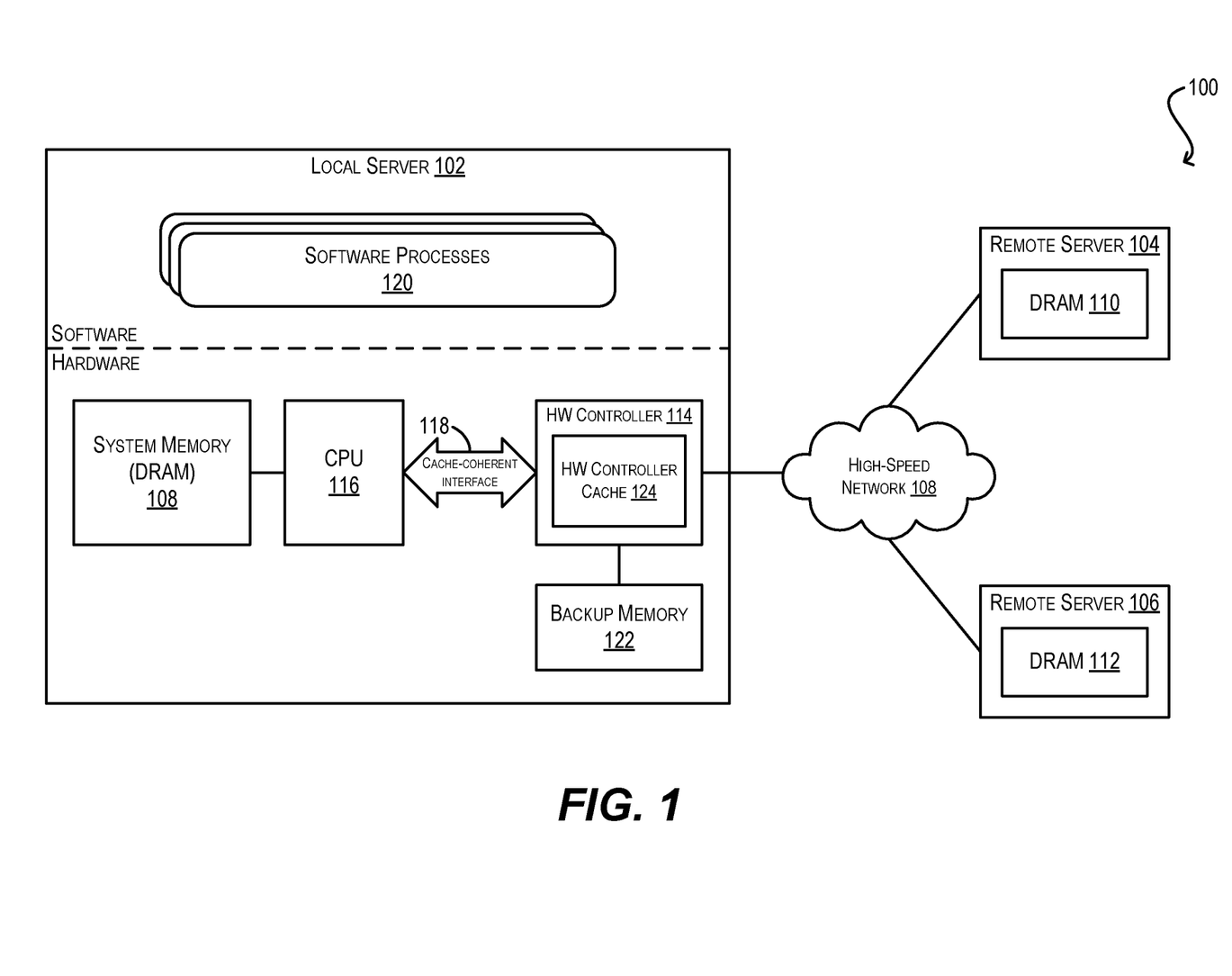
FIG. 1 depicts a system environment that implements the techniques of the present disclosure.

FIG. 1 depicts an example system environment 100 comprising a cluster of physical computer servers (i.e., a "local" server 102 and two "remote" servers 104 and 106) that implement the techniques of the present disclosure. Servers 102-106 are interconnected via a high-speed network 108 that operates at link speeds of at least 100 gigabits per second (Gb/sec). For example, in a particular embodiment system environment 100 may be a data center comprising a 100G, 200G, or 400G Ethernet network.

As shown, each server 102/104/106 of system environment 100 includes, among other things, a physical system memory component (i.e., DRAM) 108/110/112. In addition, local server 102 includes a HW controller 114 that is communicatively coupled with a CPU 116 via a cache-coherent interface 118 (e.g., Intel Ultra Path Interconnect (UPI), Compute Express Link (CXL), Cache Coherent Interconnect for Accelerators (CCIX), Gen-Z, Open Coherent Accelerator Processor Interface (OpenCAPI), etc.). In one set of embodiments, HW controller 114 may take the form of a field programmable gate array (FPGA) or an application-specific integrated circuit (ASIC) that is mounted on a PCI Express (PCIe) expansion card of local server 102. In other embodiments, HW controller 114 may be mounted directly onto the motherboard of local server 102, either as a standalone FPGA/ASIC or via integration into an existing silicon component of the motherboard (e.g., CPU 116, a memory controller, etc.).

Figure 2:
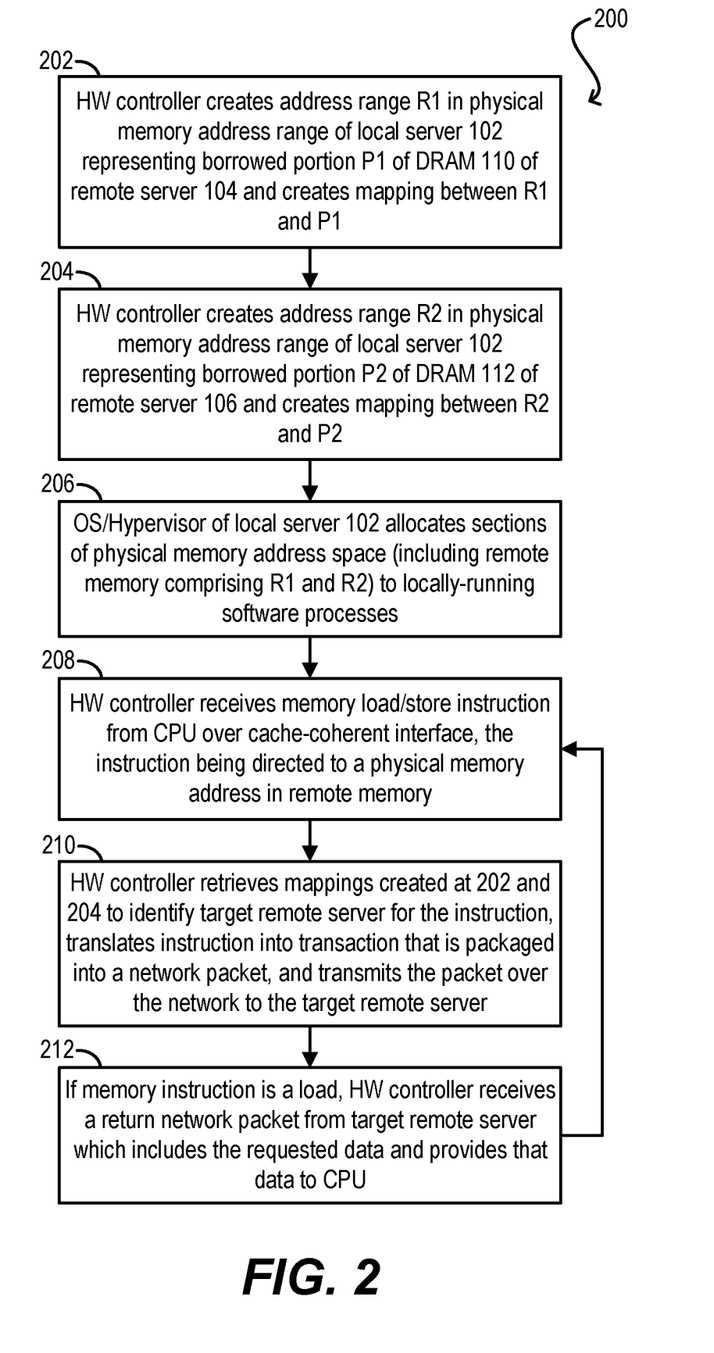
FIG. 2 depicts a workflow for implementing hardware-assisted memory disaggregation according to certain embodiments.

With HW controller 114 and its cache-coherent interface 118 to CPU 116, local server 102 can implement hardware-assisted memory disaggregation, which means local server 102 can borrow, or "import," portions of the DRAM of remote servers 104 and 106 so that those borrowed portions can be transparently used (in conjunction with local DRAM 108) by one or more software processes 120 running on local server 102. To clarify how hardware-assisted memory disaggregation may generally work, FIG. 2 depicts a high-level workflow 200 that can be executed by local server 102 and its HW controller 114 for borrowing a first portion P1 of DRAM 110 of remote server 104 and a second portion P2 of DRAM 112 of remote server 106 via this mechanism according to certain embodiments.

Workflow 200 assumes a prior decision has been made by some entity within system environment 100 that DRAM portions P1 and P2 may be borrowed/imported by local server 102 from remote servers 104 and 106; that entity may be, e.g., a cluster management server or one or more of the operating systems (OS) or hypervisors running on servers 102-106. Workflow 200 further assumes that once local server 102 has borrowed DRAM portions P1 and P2, the local CPUs of remote servers 104 and 106 will not (or cannot) access those portions until they are returned by local server 102. Stated another way, a borrowed portion of memory can only be accessed and modified by a single server (i.e., the borrowing server). This property differentiates the concept of memory disaggregation from symmetric shared memory (sometimes referred to as distributed shared memory (DSM)) and avoids the problems of cross-server data consistency/coherence and potential memory corruption that must be carefully managed under a symmetric shared memory model. In some embodiments, remote server 104 and/or 106 may be a type of server that is specifically designed to export memory to other servers within system environment 100 (rather than handle compute tasks). In these embodiments, the remote server(s) may have fewer/slower CPUs than local server 102 but a relatively large pool of DRAM for exporting purposes.

Starting with block 202 of workflow 200, HW controller 114 can create an address range R1 in the physical memory address space of local server 102 that is intended to represent borrowed portion P1 of DRAM 110 of remote server 104 and can create a mapping between newly-created address range R1 and portion P1. Similarly, at block 204, HW controller 114 can create an address range R2 in the physical memory address space of local server 102 that is intended to represent borrowed portion P2 of DRAM 112 of remote server 106 and can create a mapping between newly-created address range R2 and portion P2. Address ranges R1 and R2 are collectively referred to herein as "remote memory" because they are not backed by DRAM 108 of local server 102 (and thus their data content is not physically stored in DRAM 108); instead, they are backed by DRAM 110 and 112 of remote servers 104 and 106 respectively.

Figure 3:
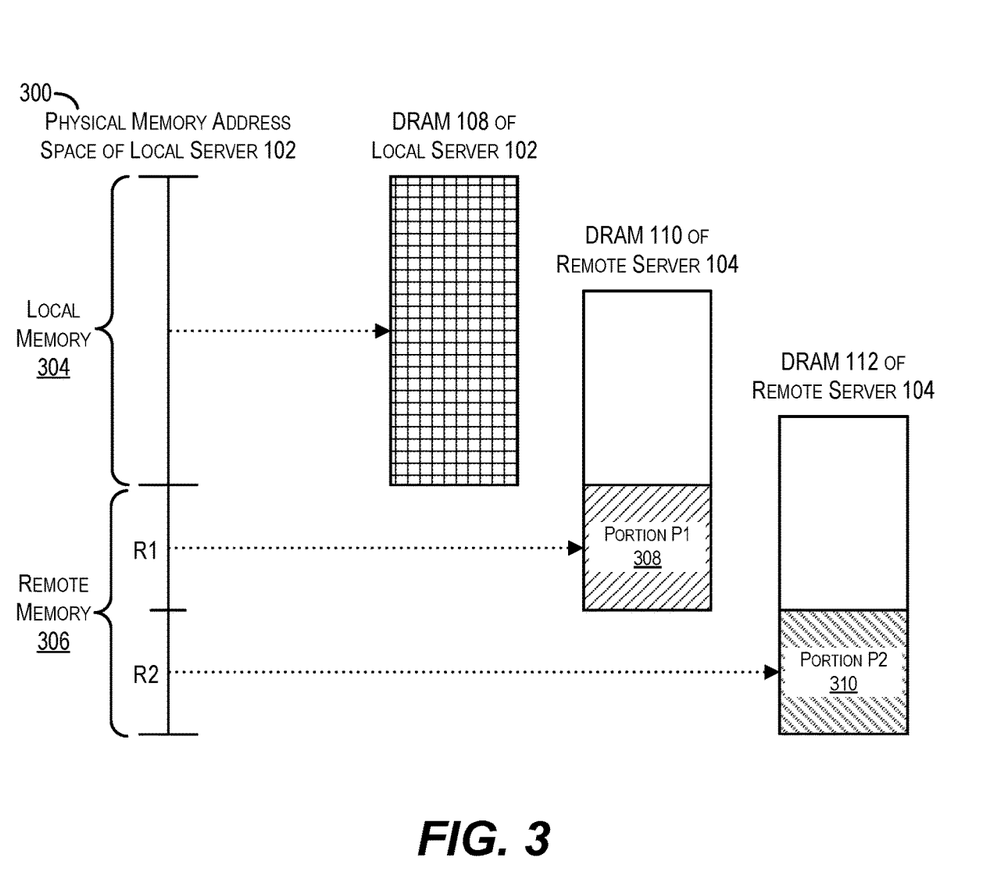
FIG. 3 depicts the physical memory address space of a local server that has borrowed system memory from remote servers using hardware-based memory disaggregation according to certain embodiments.

By way of example, FIG. 3 illustrates the physical memory address space of local server 102 (reference numeral 300) after the execution of blocks 202 and 204 of workflow 200. As shown in FIG. 3, physical memory address space 300 includes a first address range (i.e., local memory 304) which maps to DRAM 108 of local server 102. This is the physical memory address space that would typically be visible/available to CPU 116 in the absence of any memory disaggregation. However, in addition to local memory 304, physical memory address space 300 further includes address ranges R1 and R2 created at blocks 202 and 204 (collectively remote memory 306) which map to portion P1 (reference numeral 308) of DRAM 110 of remote server 104 and portion P2 (reference numeral 310) of DRAM 112 of remote server 106. Accordingly, the total size of physical memory address space 300 of local server 102—and thus the total amount of system memory that can be directly and concurrently accessed by local software processes 120—is effectively extended by the sizes of borrowed memory portions P1 and P2. For instance, if the size of DRAM 108 of local server 102 is 512 gigabytes (GB), the size of portion P1 is 64 GB, and the size of portion P2 is 128 GB, the total size of physical memory address space 300 is 512+64+128=704 GB.

At block 206 of workflow 200, an OS or hypervisor running on local server 102 can allocate sections of physical memory address space 300 (including remote memory 306) to one or more software processes 120 of local server 102. Generally speaking, the OS/hypervisor will be aware of the sections of physical memory space 300 that are remote vs. local and the particular characteristics of remote memory 306 that distinguish it from local memory 304 (e.g., higher latency, lower bandwidth, etc.). Accordingly, the OS/hypervisor can use this knowledge to allocate remote memory 306 to software processes 120 in a manner that ensures the memory is utilized efficiently and effectively. For example, due to the relatively higher latency and lower bandwidth of remote memory 306, not all applications will perform well using this type of memory. However, some applications do not require uniformly high memory performance and can make use of remote memory 306 to store some fraction of its memory footprint that is not particularly latency/bandwidth sensitive. Accordingly, the OS/hypervisor can allocate appropriate amounts of remote memory 306 to such applications.

Once the OS/hypervisor of local server 102 has allocated remote memory 306 to one or more software processes 120 per block 206, HW controller 114 can receive a memory load (read) or store (write) instruction from CPU 116 over cache-coherent interface 118 that is directed to a physical memory address in remote memory 306 (i.e., in either address range R1 or R2) (block 208). The ability of HW controller 114 to receive and handle such memory load/store instructions directly from CPU 116 is made possible by the cache-coherent nature of interface 118, which ensures that the memory managed by HW controller 114 is cacheable by CPU 116 in its CPU-level (e.g., L1/L2/L3) caches. The granularity of the memory load/store instruction received by HW controller 114 at block 208 will typically be fine grained at CPU cache line size (e.g., 32, 64, or 128 bytes) instead of page size (e.g., 4K bytes).

Then, at block 210, HW controller 114 can retrieve the mappings created at blocks 202 and 204 to identify the remote server that hosts the physical memory address being read/written, translate the memory load/store instruction into an transaction that is packaged into a network packet, and transmit the network packet over high-speed network 108 to the target remote server.

Finally, in case where the memory instruction received at block 208 is a load (read) instruction, HW controller 114 can receive a return network packet from the target remote server which includes the requested data and can provide that data to CPU 116 via cache-coherent interface 118 (block 212). Workflow 200 can subsequently return to block 208 so that HW controller 114 can receive and process the next memory load/store instruction from CPU 116.

As noted in the Background section, hardware-assisted memory disaggregation can provide a number of significant benefits for the operators of environments/data centers such as system environment 100 of FIG. 1, such as a reduction in TCO due to better system memory utilization and by avoiding the need to provision memory for the most memory-demanding applications. However, in the scenario where CPU 116 of local server 102 issues a memory load instruction to HW controller 114, HW controller 114 must return the requested data to the CPU within a specified time window T (e.g., 10 microseconds) due to the properties of cache-coherent interface 118. If HW controller 114 does not return the requested data within T, a hardware machine check exception will occur and the affected process, and possibly the server as a whole, will crash. This is problematic because there are a large number of relatively frequent network failures and other problems, such as link/equipment failures leading to network partitions, network congestion, and so on, which can prevent HW controller 114 from receiving the data from remote server 104/106 in a timely manner.

To address the foregoing and other similar issues, local server 102 of FIG. 1 further includes a novel backup memory 122 and a novel HW controller cache 124 that are coupled with, or integrated into, HW controller 114. In various embodiments, backup memory 122 can be implemented using a non-volatile memory that is slower, but also significantly cheaper, than DRAM (e.g., flash memory, Optane memory, X-point memory, etc.) and can be sized to hold the entirety of remote memory 306 borrowed by local server 102 from remote servers 104 and 106. In a particular embodiment, backup memory 122 may have a significantly lower memory write-bandwidth than DRAM. In contrast, HW controller cache 124 can be implemented using relatively fast/expensive static random-access memory (SRAM) or DRAM (either on the same chip/die as HW controller 114 or on one or more attached modules) and can be sized to hold a small percentage of remote memory 306. For example, if the size of remote memory 306 is 1 terabyte (TB), the size of HW controller cache 124 may range from a few megabytes (MB) to a few GB.

As described in further detail in section (3) below, with backup memory 122 in place, HW controller 114 of local server 102 can maintain a local copy of the entire contents of remote memory 306 within backup memory 122. Then, if a network failure or other problem occurs which prevents HW controller 114 from retrieving a requested piece of data in remote memory 306 over network 118 and returning that data to CPU 116 within required time window T, HW controller 114 can instead retrieve the data from the local copy of remote memory 306 maintained in backup memory 122. In this way, HW controller 114 can recover from the network failure/problem gracefully and avoid a machine check exception and resulting application/system crash. At the same time, due to the relatively low cost of backup memory 122, the TCO benefits of the hardware-assisted memory aggregation solution as a whole can be retained.

Further, with HW controller cache 124 in place, HW controller 114 can quickly complete memory store (write) operations directed to remote memory 306 by writing to HW controller cache 124 first (and later propagating the writes to remote servers 104/106 and backup memory 122) and can accelerate memory load (read) operations. In addition, in certain embodiments HW controller 114 can leverage HW controller cache 124 to coalesce writes to backup memory 122 into relatively large block/segments (rather than performing a write to backup memory 122 for each memory store instruction received from CPU 116). This feature advantageously reduces the total number of write operations issued to backup memory 122, which can be useful for non-volatile memory technologies such as flash memory that have limited write endurance (i.e., can only perform a certain number of writes before reaching end-of-life).

It should be appreciated that FIGS. 1-3 are illustrative and not intended to limit embodiments of the present disclosure. For example, although system environment 100 of FIG. 1 depicts a single local server and two remote servers, the techniques described herein may be applied to environments that comprise any number of such servers, with any degree of memory sharing/borrowing across those servers. Further, although remote servers 104 and 106 are described as solely exporting system memory to local server 102, each of these remote servers may also act as a "local server" in the sense that they can also borrow system memory from other servers within system environment 100. Accordingly, remote servers 104 and 106 can also include all of the various components described with respect to local server 102 (e.g., HW controller 114, cache coherent interface 118, backup memory 122, HW controller cache 124, etc.).

Yet further, although FIG. 1 depicts a particular arrangement of entities/components within system environment 100 and local server 102, other arrangements are possible (e.g., the functionality attributed to a particular entity/component may be split into multiple entities/components, entities/components may be combined, etc.), and each entity/component may include sub-components or implement functionality that is not specifically described. One of ordinary skill in the art will recognize other variations, modifications, and alternatives.

3. Remote Memory Read/Write Workflow

Figure 4:
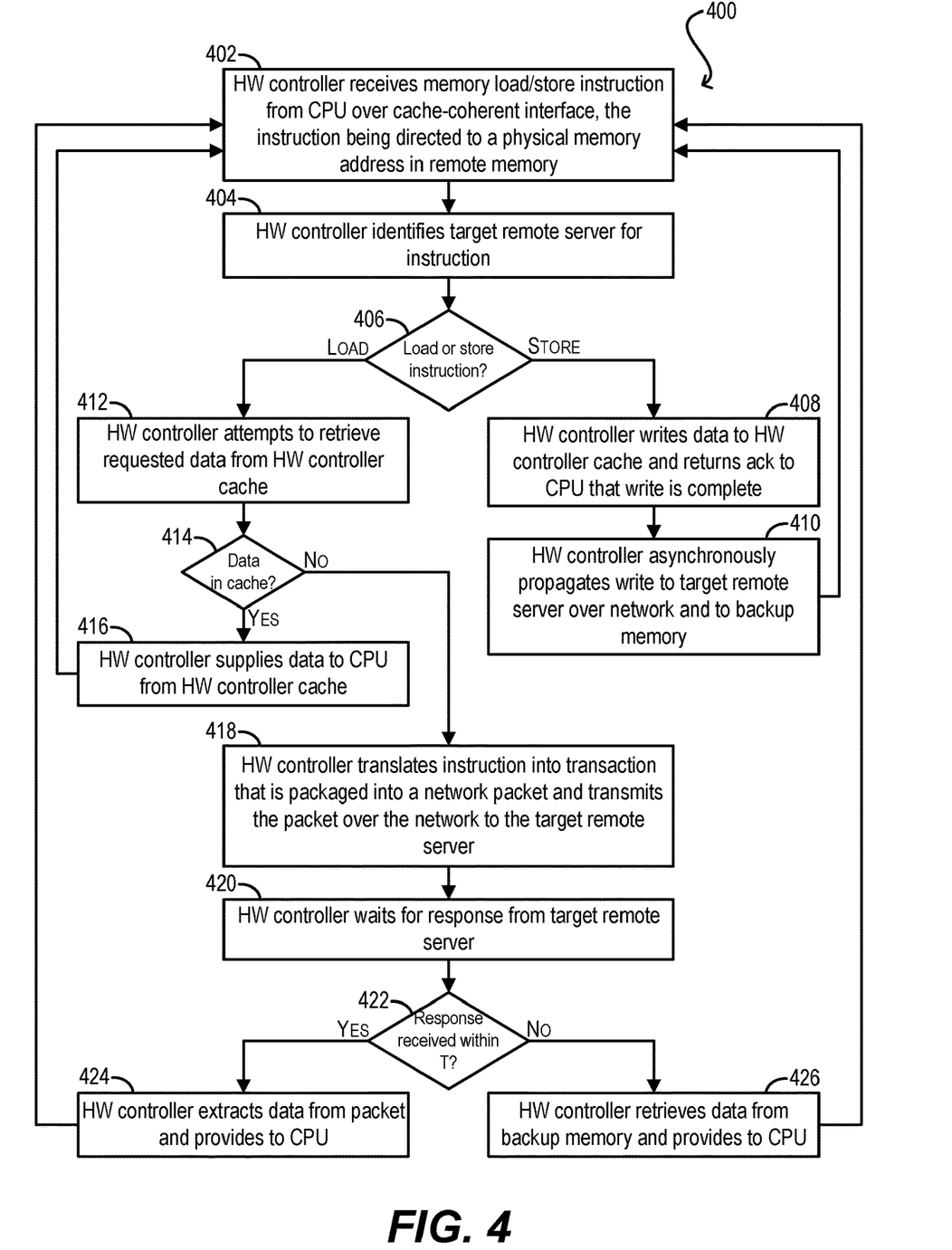
FIG. 4 depicts a workflow for implementing hardware-assisted memory disaggregation with graceful recovery from network failures/problems using a backup memory according to certain embodiments.

FIG. 4 depicts a workflow 400 that may be executed by HW controller 114 of FIG. 1, with the help of backup memory 122 and HW controller cache 124, for processing memory reads and writes to remote memory 306 in a manner that gracefully handles network failures/problems according to certain embodiments. Workflow 400 assumes that (1) HW controller 114 has created, in physical memory address space 300 of local server 102, memory address ranges R1 and R2 which make up remote memory 306 and has mapped R1 and R2 to DRAM portions P1 and P2 of remote servers 104 and 106 respectively (per blocks 202 and 204 of workflow 200), and (2) the OS/hypervisor of local server 102 has allocated remote memory 306 to one or more locally-running software processes 120 (per block 206 of workflow 200).

Starting with block 402, HW controller 114 can receive, from CPU 116 over cache-coherent interface 118, a memory load or store operation originating from a software process 120 and directed to a physical memory address in remote memory 306. In response, HW controller 114 can identify, based on the physical memory address and the HW controller's address range mappings, the remote server on which the data for that physical memory address resides (e.g., either remote server 104 or 106, referred to as the "target remote server") (block 404).

At block 406, HW controller 114 can determine whether the received memory instruction is a load (read) or a store (write). If the memory instruction is a store (write), HW controller 114 can write the data included in the instruction to HW controller cache 124 and transmit an acknowledgement to CPU 116 indicating that the write is complete (block 408). HW controller 114 can subsequently propagate the write asynchronously to the target remote server over network 118 and to backup memory 122 (block 410). As mentioned previously, in certain embodiments HW controller 114 may coalesce the data for multiple writes into a large segment and write out the entire segment to backup memory 122 via a single write operation, thereby reducing the total number of writes issued to that backup memory. This optimization involves organizing backup memory 112 using a log-structured data layout, which is discussed in section (4.1) below. Upon propagating the write to both the target remote server and backup memory 122, HW controller 114 can return to the top of workflow 400 in order to receive and process the next memory load/store instruction issued by CPU 116.

Turning now to the scenario where the received memory instruction is determined to be a load (read) at block 406, HW controller 114 can first attempt to retrieve the data requested via the load instruction from HW controller cache 124 (block 412). If the data is present in HW controller cache 124 (block 414), HW controller 114 can supply the data to CPU 116 from cache 124 (block 416) and return to block 402.

However, if the data is not present in HW controller cache 124, HW controller 114 can translate the memory load instruction into a transaction that is packaged into a network packet and transmit the network packet over high-speed network 108 to the target remote server (block 418). HW controller 114 can then wait for a response from the target remote server (block 420).

If HW controller 114 receives a response network packet from the target remote server within a time window T required by CPU 116 (or within a second time window that is slightly shorter than T) (block 422), HW controller 114 can extract the requested read data from the response network packet, provide the requested data to CPU 116 (block 424), and return to block 402.

On the other hand, if HW controller 114 does not receive a response network packet from the target remote server within T (or the second time window noted above), HW controller 114 can conclude that a network failure or some other problem has occurred. As a result, HW controller 114 can retrieve the requested data from backup memory 122 and provide the retrieved data to CPU 116 (block 426). In this scenario, CPU 116 may notice a slight increase in memory latency, but the additional latency will not be high enough to trigger a machine check exception and application/system crash.

4. Optimizations/Extensions
4.1 Backup Memory Organization

While the foregoing description generally assumes that back-up memory 122 is organized as an exact copy of remote memory 306, in some embodiments the organization of back-up memory 122 may be optimized in various ways in order to improve its efficiency and/or other characteristics. For example, these optimizations (which may be implemented individually or in combination) can include:

1. Implementing backup memory 122 using a log-structured data layout—As known in the art, a log-structured data layout (sometime referred to as a log-structured file system or LFS) is a data layout in which logical data units are not overwritten in place on a physical storage/memory medium; instead, any changes to one or more logical data units are added to the physical storage/memory medium as "new" data in a log format, and physical data blocks/units comprising earlier versions of those logical data units are ultimately garbage collected and reused. This is in contrast to "over-write based" data layouts in which each logical data unit is mapped to a particular physical storage/memory address and any modifications to that logical data unit are written/overwritten to its mapped physical address. By organizing backup memory 122 using a log-structured data layout, it is possible for HW controller 114 to coalesce data for multiple writes into a large segment and then write out the entire segment via a single write operation to backup memory 122 (as a new log entry in the log). Accordingly, this advantageously allows for a reduction in the total number of writes issued to backup memory 122, at the expense of some additional complexity for managing the log data structure.

2. Compressing backup memory 122—The working (i.e., in-memory) datasets of software applications typically exhibit a significant amount of redundancy. Accordingly, compression can be employed to reduce the size of the data written to backup memory 122 and thereby reduce its write bandwidth requirements and improve its usage efficiency. In embodiments where compression is implemented in combination with the log-structured data layout noted above, the data maintained in backup memory 122 can be compressed at the segment, rather than cache line, level, which can advantageously lead to higher compression ratios.

3. Deduplicating backup memory 122—Some software applications process a multitude of similar transactions, resulting in memory footprints that contain a large amount of identical/repetitive data. Accordingly, data deduplication techniques can be employed to avoid writing/storing redundant data and achieve gains in write bandwidth and memory usage efficiency in a manner similar to data compression.

4. Tracking "zero" regions in backup memory 122— Some software applications use memory sparsely (i.e., write non-zero values to a relatively small percentage of the memory address range allocated to the application). To exploit this, in certain embodiments HW controller 114 can track regions of backup memory 122 that contain all zeros and only write data to backup memory 122 if that data includes non-zero values.

4.2 Additional Use Cases

Beyond gracefully handling network failures/problems at the time of processing memory read/writes to remote memory, the techniques of the present disclosure may also be applied to address problems or provide utility in several other contexts/use cases. For example, because of the relatively low cost of backup memory 122, it is possible to (1) increase its size to exceed the total memory footprint of VMs running on local server 102, and (2) configure a hypervisor running on local server 102 leverage backup memory 122 for VM check-pointing. For instance, at the time a checkpoint is needed for a given VM A, the hypervisor can place a marker in backup memory 122 (assuming it employs a log-structured data layout) such that all memory operations received/processed before the marker are considered part of the checkpoint for VM A and all memory operations received/processed after the marker are considered as occurring after the checkpoint. With this mechanism, the check-pointing can be performed in a manner that has minimal impact on VM A's performance and is completely transparent to the VM.

As another example, consider the scenario of live migrating a VM from a source host server to a destination host server. With existing live migration techniques, network problems between the source and destination host servers can interfere with the migration process. Thus, these existing live migration techniques generally employ a conservative strategy which involves keeping all of the in-memory data for the VM on the source host server until a switch over to the migrated copy of the VM on the destination host server can succeed.

With the techniques of the present disclosure, it is possible for a HW controller on the source host server to map a portion of the system memory of the destination host server as remote memory and run the VM to-be-migrated directly out of this remote memory (rather than using local system memory) while VM's memory pages are copied over to the destination host server. This advantageously frees up the local system memory of the source host server consumed by the VM, before the migration is fully completed. If a network failure occurs during the migration process which prevents it from completing successfully, the source host server can retrieve the copy of the VM's memory state from backup memory 122 and restore that state within its local system memory. Thus, the source host server can gracefully recover from the failure, despite aggressively freeing up the VM's local memory allocation during the normal migration workflow.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method comprising:
receiving, by a hardware controller of a computer system, a memory instruction from a central processing unit (CPU) of the computer system over a cache-coherent interface, wherein the memory instruction is directed to a physical memory address in a remote memory of the computer system, wherein the remote memory corresponds to a section of a physical memory address space of the computer system that is mapped to portion of a physical system memory of another computer system, and wherein the portion of physical system memory of said another computer system is a borrowed memory portion that is inaccessible by other computer systems while it is mapped to the section of the physical memory space of the computer system;
determining, by the hardware controller, whether the memory instruction is a memory load instruction or a memory store instruction; and
upon determining that the memory instruction is a memory store instruction for writing data to the physical memory address in the remote memory:
writing, by the hardware controller, the data associated with the memory store instruction in a cache of the hardware controller; and
at a later time propagating, by the hardware controller, the data written to the cache to the portion of the physical system memory of said another computer system and to a backup memory of the computer system that is attached to the hardware controller.

2. The method of claim 1 wherein the backup memory is implemented using a non-volatile memory.

3. The method of claim 1 further comprising, upon determining that the memory instruction is a memory load instruction:

determining, by the hardware controller, whether data requested via the memory load instruction is present in the cache of the hardware controller; and upon determining that the data requested via the memory load instruction is not present in the cache of the hardware controller:

translating, by the hardware controller, the memory load instruction into a transaction;

packaging, by the hardware controller, the transaction into a network packet;

transmitting, by the hardware controller, the network packet to said another computer system; and waiting, by the hardware controller, for a response from said another computer system.

4. The method of claim 3 further comprising, upon determining that the response is not received from said another computer system within a time window T:

retrieving, by the hardware controller, the data requested via the memory load instruction from the backup memory attached to the hardware controller; and providing, by the hardware controller, the data retrieved from the backup memory to the CPU over the cache coherent interface.

5. The method of claim 4 wherein if the CPU does not receive the data requested via the memory load instruction from the hardware controller within the time window T, the CPU triggers a hardware error condition.

6. The method of claim 3 further comprising, upon determining that the response is received from said another computer system within a time window T:

extracting, by the hardware controller, the data requested via the memory load instruction from the response; and providing, by the hardware controller, the data extracted from the response to the CPU over the cache coherent interface.

7. The method of claim 1 wherein the backup memory is organized using a log-structured data layout, and wherein propagating the data written to the cache to the backup memory comprises:

aggregating, by the hardware controller, data associated with multiple memory store instructions into a single segment; and writing, by the hardware controller, the single segment via a single write operation to the backup memory.

8. A hardware controller implemented in a computer system, the hardware controller configured to:

receive a memory instruction from a central processing unit (CPU) of the computer system over a cache-coherent interface, wherein the memory instruction is directed to a physical memory address in a remote memory of the computer system, wherein the remote memory corresponds to a section of a physical memory address space of the computer system that is mapped to portion of a physical system memory of another computer system, and wherein the portion of physical system memory of said another computer system is a borrowed memory portion that is inaccessible by other computer systems while it is mapped to the section of the physical memory space of the computer system;

determine whether the memory instruction is a memory load instruction or a memory store instruction; and upon determining that the memory instruction is a memory store instruction for writing data to the physical memory address in the remote memory:

write the data associated with the memory store instruction in a cache of the hardware controller; and at a later time, propagate the data written to the cache to the portion of the physical system memory of said another computer system and to a backup memory of the computer system that is attached to the hardware controller.

9. The hardware controller of claim 8 wherein the backup memory is implemented using a non-volatile memory.

10. The hardware controller of claim 8 wherein the hardware controller is further configured to, upon determining that the memory instruction is a memory load instruction:

determine whether data requested via the memory load instruction is present in the cache of the hardware controller; and upon determining that the data requested via the memory load instruction is not present in the cache of the hardware controller:

translate the memory load instruction into a transaction;

package the transaction into a network packet;

transmit the network packet to said another computer system; and wait for a response from said another computer system.

11. The hardware controller of claim 10 wherein the hardware controller is further configured to, upon determining that the response is not received from said another computer system within a time window T:

retrieve the data requested via the memory load instruction from the backup memory attached to the hardware controller; and provide the data retrieved from the backup memory to the CPU over the cache coherent interface.

12. The hardware controller of claim 11 wherein if the CPU does not receive the data requested via the memory load instruction from the hardware controller within the time window T, the CPU triggers a hardware error condition.

13. The hardware controller of claim 10 wherein the hardware controller is further configured to, upon determining that the response is received from said another computer system within a time window T:

extract the data requested via the memory load instruction from the response; and provide the data extracted from the response to the CPU over the cache coherent interface.

14. The hardware controller of claim 8 wherein the backup memory is organized using a log-structured data layout, and wherein propagating the data written to the cache to the backup memory comprises:

aggregating data associated with multiple memory store instructions into a single segment; and writing the single segment via a single write operation to the backup memory.

15. A computer system comprising:

a central processing unit (CPU);

a hardware controller communicatively coupled with the CPU via a cache-coherent interface and comprising a hardware controller cache; and a backup memory communicatively coupled with the hardware controller, wherein the hardware controller is configured to:

receive a memory instruction from the CPU over the cache-coherent interface, wherein the memory instruction is directed to a physical memory address in a remote memory of the computer system, wherein the remote memory corresponds to a section of a physical memory address space of the computer system that is mapped to portion of a physical system memory of another computer system, and wherein the portion of physical system memory of said another computer system is a borrowed memory portion that is inaccessible by other computer systems while it is mapped to the section of the physical memory space of the computer system;

determine whether the memory instruction is a memory load instruction or a memory store instruction; and upon determining that the memory instruction is a memory store instruction for writing data to the physical memory address in the remote memory:

write the data associated with the memory store instruction in the hardware controller cache; and at a later time, propagate the data written to the hardware controller cache to the portion of the physical system memory of said another computer system and to the backup memory.

16. The computer system of claim 15 wherein the backup memory is implemented using a non-volatile memory.

17. The computer system of claim 15 wherein the hardware controller is further configured to, upon determining that the memory instruction is a memory load instruction:

determine whether data requested via the memory load instruction is present in the hardware controller cache; and upon determining that the data requested via the memory load instruction is not present in the hardware controller cache:

translate the memory load instruction into a transaction;
package the transaction into a network packet;
transmit the network packet to said another computer system; and
wait for a response from said another computer system.

18. The computer system of claim 17 wherein the hardware controller is further configured to, upon determining that the response is not received from said another computer system within a time window T:

retrieve the data requested via the memory load instruction from the backup memory; and provide the data retrieved from the backup memory to the CPU over the cache coherent interface.

19. The computer system of claim 18 wherein if the CPU does not receive the data requested via the memory load instruction from the hardware controller within the time window T, the CPU triggers a hardware error condition.

20. The computer system of claim 17 wherein the hardware controller is further configured to, upon determining that the response is received from said another computer system within a time window T:

extract the data requested via the memory load instruction from the response; and provide the data extracted from the response to the CPU over the cache coherent interface.

21. The computer system of claim 15 wherein the backup memory is organized using a log-structured data layout, and wherein the hardware controller propagates the data written to the hardware controller cache to the backup memory by:

aggregating data associated with multiple memory store instructions into a single segment; and writing the single segment via a single write operation to the backup memory.

* * * * *